United States Patent
Horibe et al.

(10) Patent No.: US 11,069,917 B2
(45) Date of Patent: Jul. 20, 2021

(54) STACKED FILM BATTERY ARCHITECTURE

(71) Applicant: INTERNATIONAL BUSINESS MACHINES CORPORATION, Armonk, NY (US)

(72) Inventors: Akihiro Horibe, Kawasaki (JP); Kuniaki Sueoka, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 16/436,325

(22) Filed: Jun. 10, 2019

(65) Prior Publication Data
US 2019/0296387 A1 Sep. 26, 2019

Related U.S. Application Data

(62) Division of application No. 15/269,128, filed on Sep. 19, 2016, now Pat. No. 10,431,847.

(51) Int. Cl.
*H01M 10/04* (2006.01)
*H01M 10/0525* (2010.01)
(Continued)

(52) U.S. Cl.
CPC ......... *H01M 10/0436* (2013.01); *H01M 4/04* (2013.01); *H01M 4/0402* (2013.01);
(Continued)

(58) Field of Classification Search
CPC ......... H01M 10/0436; H01M 10/0525; H01M 10/0562; H01M 10/0585;
(Continued)

(56) References Cited

U.S. PATENT DOCUMENTS 8,691,450 B1 4/2014 Srinivasan et al.
9,249,522 B2 2/2016 Golodnitsky et al.
(Continued)

FOREIGN PATENT DOCUMENTS

WO 2016/033379 3/2016

OTHER PUBLICATIONS

Loïc Baggetto et al., 3D negative electrode stacks for integrated all-solid-state lithium-ion microbatteries, J. Mater. Chem., Mar. 2010, pp. 3703-3708.
(Continued)

*Primary Examiner* — Victoria H Lynch
(74) *Attorney, Agent, or Firm* — Tutunjian & Bitetto, P.C.; Randall Bluestone

(57) ABSTRACT

A method for fabricating a stacked battery structure. The method includes preparing a plurality of battery layers separately, wherein each battery layer includes a substrate, a film battery element fabricated on the substrate and an insulator formed over the film battery element. The insulator has a flat top surface and the film battery element includes a current collector. The method also includes stacking the plurality of battery layers, wherein the insulator of a first battery layer of the plurality of battery layers bonds to the substrate of a second battery layer of the plurality of battery layers by the flat top surface. The method further includes forming a conductive path within the plurality of battery layers, wherein the conductive path connects with at least one of the current collectors of the plurality of battery layers.

20 Claims, 8 Drawing Sheets

(51) Int. Cl.
*H01M 10/0562* (2010.01)
*H01M 4/04* (2006.01)
*H01M 4/131* (2010.01)
*H01M 4/505* (2010.01)
*H01M 4/485* (2010.01)
*H01M 4/58* (2010.01)
*H01M 10/0585* (2010.01)
*H01M 6/40* (2006.01)

(52) U.S. Cl.
CPC .......... *H01M 4/043* (2013.01); *H01M 4/045* (2013.01); *H01M 4/0492* (2013.01); *H01M 4/131* (2013.01); *H01M 4/485* (2013.01); *H01M 4/505* (2013.01); *H01M 4/58* (2013.01); *H01M 6/40* (2013.01); *H01M 10/0525* (2013.01); *H01M 10/0562* (2013.01); *H01M 10/0585* (2013.01); *H01M 2300/0068* (2013.01); *H01M 2300/0071* (2013.01)

(58) Field of Classification Search
CPC . H01M 2300/0068; H01M 2300/0071; H01M 4/04; H01M 4/0402; H01M 4/043; H01M 4/045; H01M 4/0492; H01M 4/131; H01M 4/485; H01M 4/505; H01M 4/58; H01M 6/40; Y02E 60/10
See application file for complete search history.

(56) References Cited

U.S. PATENT DOCUMENTS

| | | | |
|---|---|---|---|
| 2009/0136839 A1* | 5/2009 | Kraznov | H01M 6/186 429/160 |
| 2010/0012498 A1 | 1/2010 | Niessen et al. | |
| 2012/0321938 A1* | 12/2012 | Oukassi | H01M 10/052 429/162 |
| 2014/0227609 A1* | 8/2014 | Frey | H01M 6/185 429/322 |
| 2015/0194697 A1* | 7/2015 | Hung | H01M 2/204 429/158 |
| 2015/0207171 A1 | 7/2015 | Chang et al. | |
| 2018/0315965 A1* | 11/2018 | Fallourd | H01M 10/0436 |

OTHER PUBLICATIONS

M.E. Donders et al., Atomic Layer Deposition of LiCoO2 Thin-Film Electrodes for All-Solid-State Li-Ion Micro-Batteries, Journal of the Electrochemical Society, Mar. 2013, pp. A3066-A3071.
An Hardy et al., Towards a solution deposited 3D thin-film Li-ion battery, 40th International Conference and Expo on Advanced Ceramics and Composites, Florida, Jan. 2016 (abstract only attached).
List of IBM Patents or Patent Applications Treated as Related dated Jun. 10, 2019, 2 pages.
U.S. Office Action issued in U.S. Appl. No. 16/436,206 dated Oct. 21, 2020, pp. 1-27.

* cited by examiner

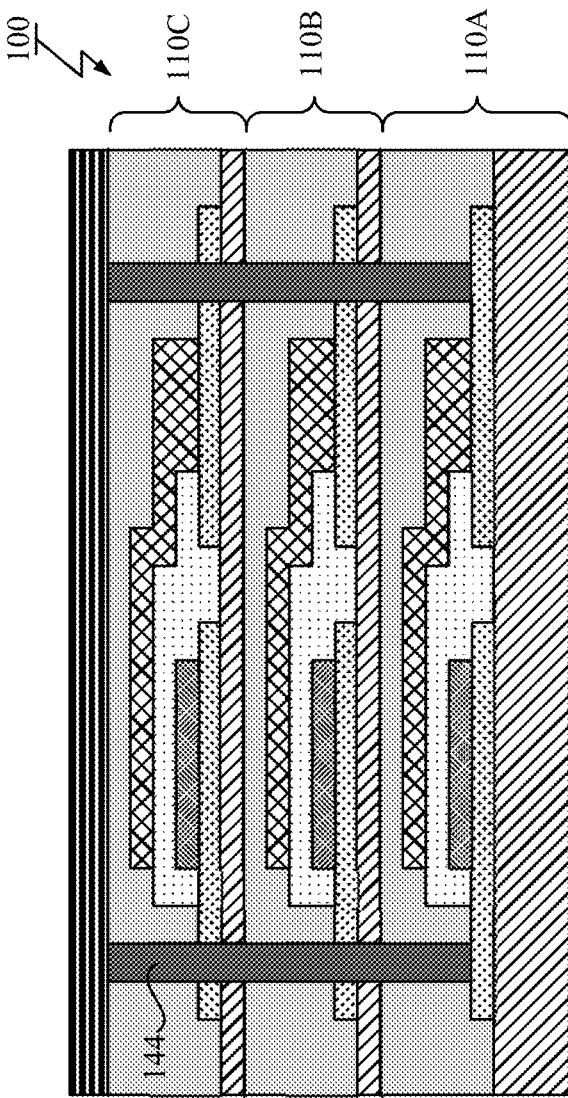
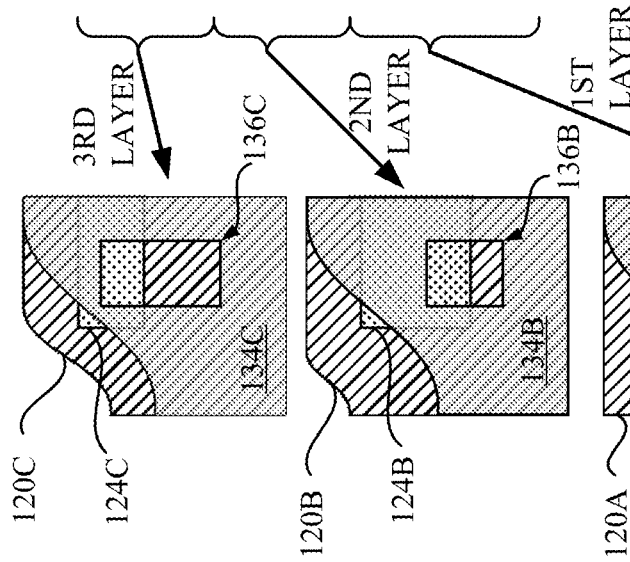
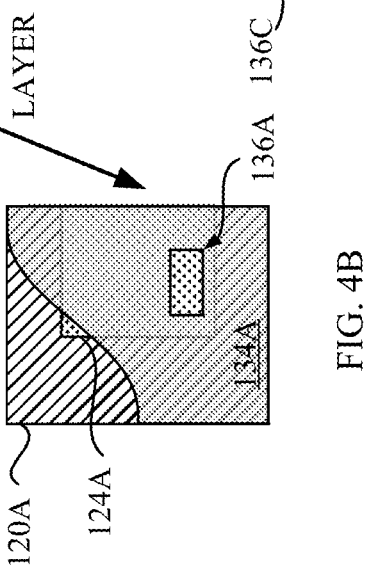
FIG. 4A
FIG. 4B
FIG. 4C
FIG. 4D
FIG. 4E

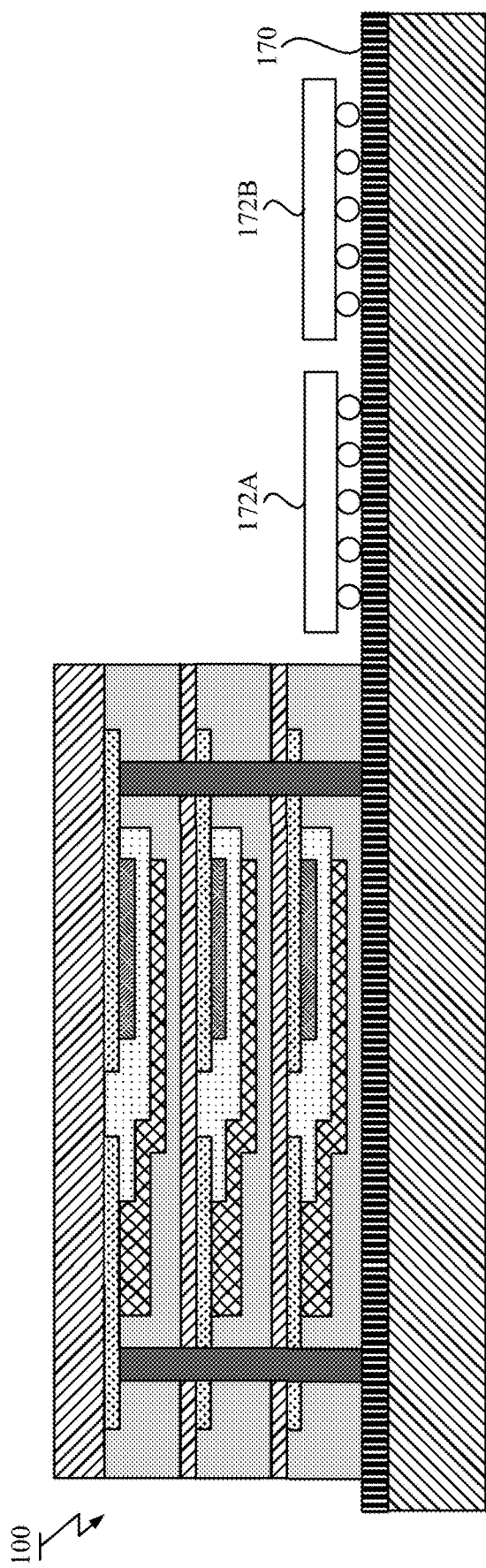
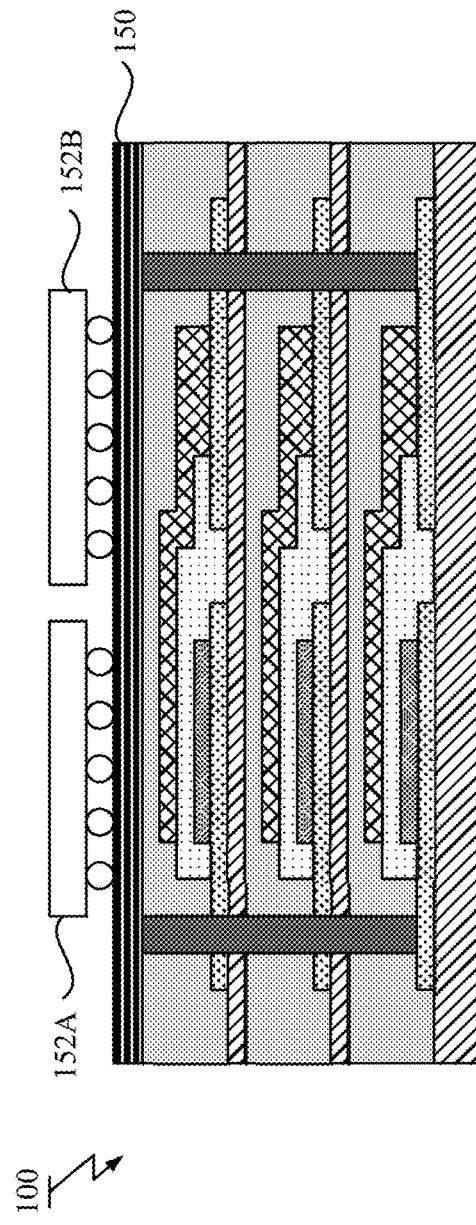
FIG. 7A
FIG. 7B

STACKED FILM BATTERY ARCHITECTURE

BACKGROUND

Technical Field

The present invention, generally, relates to battery technology and, more particularly, to stacked battery structures and methods for fabricating thereof.

Description of the Related Art

In response to demand for miniaturization of computing systems, millimeter scale computing systems have been developed. To achieve a small computing system, which may be used for Internet of Things (IoT) devices, one of the concerns is its power sources. The small computing system may require a small footprint battery.

Recently, a solid thin film battery (STFB) has been attracted as one of promising batteries for the IoT devices in terms of its small footprint and safety attribute. However, the small STFB does not have enough energy capacity and small internal resistance. The STFB can be enlarged by ingenious spattering techniques to increase its energy capacity, but its footprint becomes larger. Thickening of the STFB is known to be technically difficult.

Stacking may be a solution for enlarging the capacity of the battery using the STFB. However, since a solid electrolyte used for STFB such as lithium phosphorus oxynitride (LiPON) is known to be brittle, stacking may be required to be performed under low mechanical stress conditions. Even nominal mechanical stress on an electrode/electrolyte interface would cause damage on the solid electrolyte, which leads to short circuit. Furthermore, cathode materials, such as $LiCoO_2$, may require a high temperature annealing process, which makes sequential stacking difficult from a view point of heat resistance of other components.

A battery array that includes a plurality of prepackaged thin-film batteries and a plurality of battery trays is known, wherein each of the trays has at least one battery well and an associated battery received therein, in which the battery trays are arranged in stacked relation. However, such stacked structure would not be suitable for miniaturization since the trays each receiving prepackaged solid state battery are stacked.

Therefore, a stacked film battery architecture that is suitable for miniaturization and is capable of improving battery characteristics while maintaining small footprint and reducing internal mechanical stress is needed.

SUMMARY

According to an embodiment of the present invention, a method for fabricating a stacked battery structure is provided. The method includes preparing a plurality of battery layers separately each including a substrate, a film battery element fabricated on the substrate and an insulator formed over the film battery element. The insulator has a flat top surface and the film battery element includes a current collector. The method also includes stacking the plurality of battery layers such that the insulator of one of the plurality of battery layers bonds to the substrate of other of the plurality of battery layers by the flat top surface of the insulator. The method further includes forming a conductive path within the plurality of battery layers such that the conductive path connects with at least one of the current collectors of the plurality of battery layers.

The stacked battery structure fabricated by the method according to an embodiment of the present invention can have an improved battery characteristic (e.g., large capacity, small internal resistance and/or high voltage depending on a mode of connection) while maintaining small footprint and reducing internal mechanical stress. Since each battery layer prepared for stacking has the film battery element that is already fabricated, other components of the stacked battery structure would not be damaged due to heating process for fabricating the film battery element.

In an embodiment, preparing may include arranging the substrate with the film battery element fabricated thereon for each battery layer. Preparing may also include depositing an insulation material over the film battery element for each battery layer. Preparing may further include flattening the insulation material to form the insulator with the flat top surface for each battery layer. Thereby, a good bonding quality between the battery layers can be achieved by using standard techniques, and mechanical damage on the film battery element can be reduced. The overall structure of the stacked battery layers would have a rigid structure.

In another embodiment, preparing may include opening a hole into the insulator at a position corresponding to the conductive path for each battery layer. Forming may include connecting the holes in the insulators of the plurality of battery layers by etching at least one substrate of the plurality of battery layers to form a through via. Since the holes of the insulator for the through via is opened in advance, subsequent etching can be conducted with high selectivity. Furthermore, since connection between the plurality of battery layers are made by the through via formed within the plurality of battery layers, the stacked battery structure would have space-saving layout.

In an embodiment, the holes may have at least one respective horizontal dimension enlarged from bottom to top in the plurality of battery layers. The holes may be overlapped each other in a horizontal plane of the substrate. Such stepped shape structure would enable the stacked battery structure to have reliable contact between the conductive path and the current collectors of the film battery layers.

In an embodiment, the plurality of battery layers may have a common planar structure and the holes may have same shape and same dimensions. The common planar structure and the holes may be shifted along with a direction in a horizontal plane of the substrate. Such overhanging shape structure would enable fabrication of the stacked battery structure with low cost while achieving reliable connection between the conductive path and the current collectors, since the holes can be opened using same design. Even such structure does not obstruct forming of the conductive path.

In another embodiment, the insulator may be formed from a resin having a predetermined curing temperature in a range of 50-350 degrees Celsius. The film battery element may include a cathode that may be annealed at a predetermined annealing temperature in a range of 500-700 degrees Celsius after low temperature deposition or deposited under a predetermined deposition temperature in a range of 500-700 degrees Celsius prior to at least the stacking. Since the cathode may be fabricated before the stacking, the material of the cathode can be transformed into a crystalline phase without damaging the other components of the stacked battery structure by heat, as long as the other components can withstand the curing temperature.

In another embodiment, the substrate may be a wafer or panel and the substrate may include a plurality of film battery elements for each battery layers. The method may further include, posterior to at least the stacking, dicing the plurality of battery layers into a plurality of chips, each of which has each stacked battery structure. Thereby, the stacked structure can be fabricated at wafer-level or a panel-level, which results in a low cost fabrication and is preferable in terms of miniaturization.

According to an embodiment of the present invention, a stacked battery structure is provided. The stacked battery structure includes two or more stacked battery layers and a conductive path formed within the two or more stacked battery layers. Each battery layer includes a substrate, a film battery element, which has a current collector, on the substrate and an insulator over the film battery element. The insulator of lower one of the two or more stacked battery layers has a flat top surface bonding to the substrate of upper one of the two or more stacked battery layers. The conductive path connects with at least one of the current collectors of the two or more stacked battery layers.

The stacked battery structure according to one embodiment of the present invention can have an improved battery characteristic (e.g., large capacity, small internal resistance and/or high voltage depending on a mode of connection) while maintaining small footprint and reducing internal mechanical stress.

According to an embodiment of the present invention, a stacked battery structure is provided. The stacked battery structure includes two or more stacked solid battery layers and a through via formed in a hole opened through the two or more stacked solid battery layers. The two or more stacked solid battery layers have a common planar structure, each of which is shifted along with at least one direction in a horizontal plane of the stacked battery structure. The two or more stacked solid battery layers are bonded by an adhesive flatten layer provided therebetween. The hole has a plurality of sections, each of which corresponds to each solid battery layer. At least one of the plurality of sections may have a terrace or inner bottom surface exposing the respective current collector of the corresponding layer.

The stacked battery structure according to an embodiment of the present invention can have an improved battery characteristic while maintaining small footprint and reducing internal mechanical stress. Since the stacked solid battery layers are shifted and the surface of each current collector are exposed to the through via, reliable contact between the through via and the current collectors of the film battery layers can be archived. Also since connection between the plurality of battery layers are made by the through via formed within the plurality of battery layers, the stacked battery structure would have space-saving layout.

According to an embodiment of the present invention, an electronic device that has the aforementioned stacked battery structure is provided.

Since the power source of the electronic device has a small footprint, overall size of the electronic device can be miniaturized.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

FIGS. 4A-4E shows a schematic of connected current collectors in the stacked battery structure according to an embodiment of the present invention;

FIGS. 7A and 7B depict electronic devices including a stacked battery structure according to one or more embodiments of the present invention.

DETAILED DESCRIPTION

The present invention will be described using particular embodiments, and the embodiments described hereafter are understood to be only referred as examples and are not intended to limit the scope of the present invention.

One or more embodiments according to the present invention are directed to a stacked battery structure, a method for fabricating the stacked battery structure and an electronic device including the stacked battery structure, in which a plurality of film battery elements is arranged in a stacked manner.

Hereinafter, referring to FIG. 1, it will be described a schematic of a stacked battery structure 100 according to an exemplary embodiment of the present invention.

Figure 1:
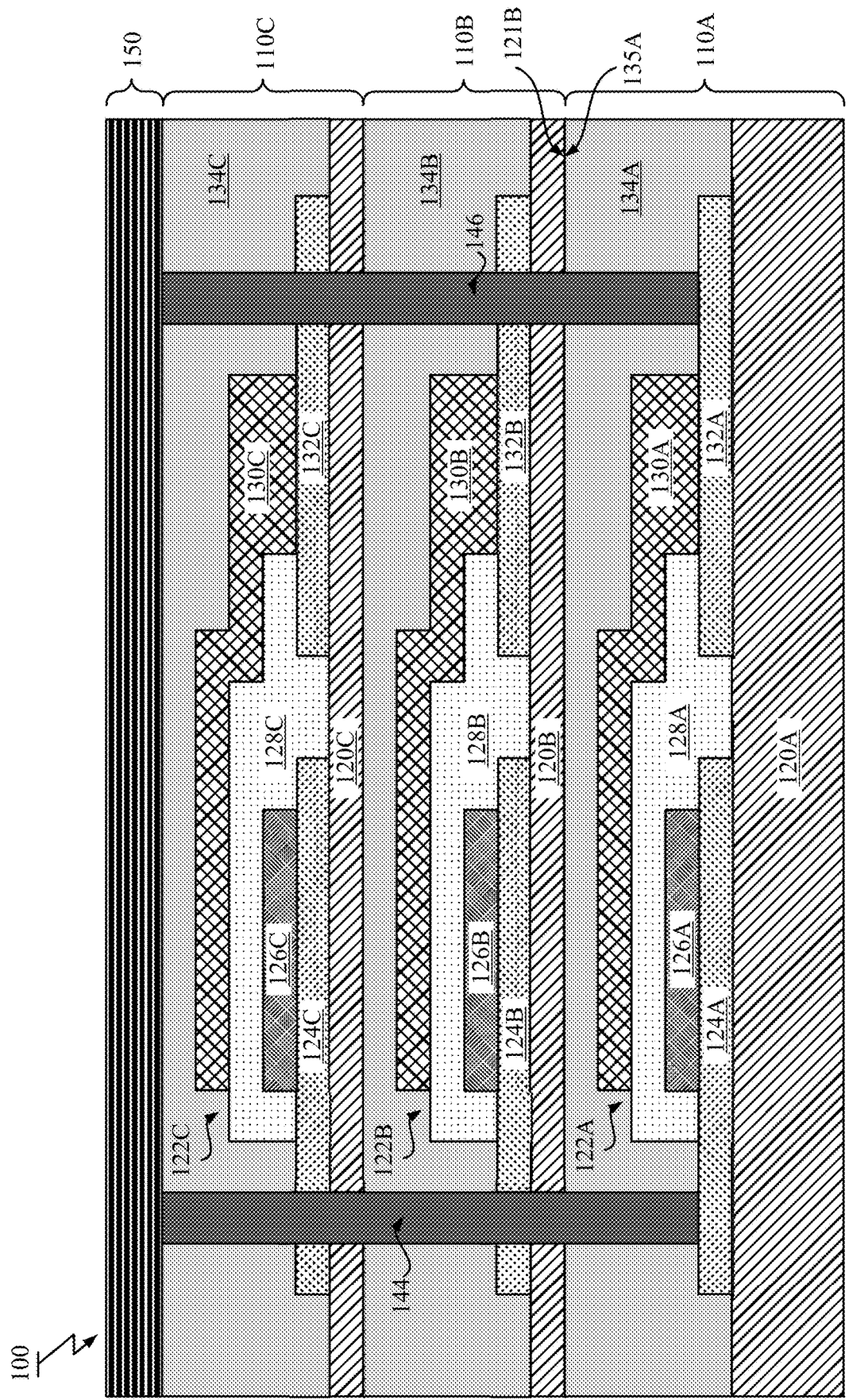
FIG. 1 illustrates a cross-sectional view of a stacked battery structure according to an embodiment of the present invention.

FIG. 1 illustrates a cross-sectional view of the stacked battery structure 100. As shown in FIG. 1, the stacked battery structure 100 may include two or more stacked battery layers 110 (e.g., layers 110A-110C), a pair of through vias 144, 146 formed within the stacked battery layers 110, and a wiring layer 150 form on a top of the stacked battery layers 110.

As shown in FIG. 1, there are three battery layers 110A-110C in the stacked battery structure 100. However, the number of the battery layers 110 may not be limited to the specific embodiment shown in FIG. 1. In one or more other embodiments, more than three battery layers may be stacked to form the stacked battery structure 100.

As shown in FIG. 1, each battery layer 110 may include a substrate 120 (e.g., 120A-120C), a solid thin film battery element 122 (e.g., 122A-122C) fabricated on the substrate 120 and an insulator 134 (e.g., 134A-134C) formed over the solid thin film battery element 122 and the substrate 120.

The substrate 120 may be made of any one of non-conductive substrate materials, such as a silicon, a alumina ceramic, a glass, mica, etc. The insulator 134 may be made from a resin, which may have a predetermined curing temperature in a range of 50-350 degrees Celsius, more preferably 150-250 degrees Celsius. Photosensitive adhesive, such as BCB (benzocyclobutene) resin, etc., may be used for the insulator 134. Other laser-processable insulator materials that can be drilled by a laser may be also used for the insulator 134 instead of the photosensitive adhesive.

The lower and upper battery layers (e.g., a first layer 110A and a second layer 110B) may be bonded by the insulator 134 (e.g., a first insulator 134A) that may be an adhesive layer provided between the lower and upper battery layers (e.g., the first layer 110A and the second layer 110B). The insulator of the lower battery layer (e.g., the first insulator 134A) has a flat top surface (e.g., a first flat top surface 135A) bonding to the substrate 120 of the upper battery layer (e.g., a second substrate 120B). The substrate 120 of the upper battery layer (e.g., the second substrate 120B) has a flat bottom surface (e.g., a second flat bottom surface 121B) bonded to the insulator 134 of the lower battery layer (e.g., the first insulator 134A). By curing the material of the insulator 134, the flat top surface of the lower insulator 134 (e.g., the first flat top surface 135A) and the flat bottom surface of the upper substrate 120 (e.g., the second flat bottom surface 121B) are rigidly fixed to each other.

Each solid thin film battery element 122 may include a cathode current collector (CCC) 124, a cathode 126 connected to the cathode current collector 124, an electrolyte 128 having an interface to the cathode 126, an anode 130 having an interface to the electrolyte 128, and an anode current collector (ACC) 132 connected to the anode 130.

The cathode current collector 124 and the anode current collector 132 may be formed on the substrate 120. The cathode current collector 124 and the anode current collector 132 may be made of any one metal (e.g., Cu, Pt, Al, Au, etc.) and other conductive materials (e.g., graphite, carbon nanotube, silicon, etc.) as long as it is adequate for respective material of the cathode 126 and the anode 130.

The cathode 126 may be made of crystalline or nanocrystalline lithium intercalation compounds such as $LiCoO_2$, $LiMn_2O_4$, etc. to name but a few. The material of the cathode 126 can be deposited by using conventional vapor deposition technique such as sputtering, and the film obtained by low temperature deposition may be annealed at a predetermined annealing temperature in a range of 500-700 degrees Celsius to obtain fully crystalline phases. Alternatively, the material of the cathode 126 can be deposited by using conventional vapor deposition technique while heating the substrate 120 at a predetermined deposition temperature in a range of 500-700 degrees Celsius. Although the stacked battery structure 100 may be advantageous for such cathode material that is annealed or deposited at relatively high temperature, however, in other embodiments, an unannealed cathode material, such as nano-crystalline $Li_xMn_{2-y}O_4$, may not be excluded from candidates of the cathode material.

The electrolyte 128 may include solid electrolytes such as ceramic electrolyte including lithium oxide based electrolytes (e.g., a lithium phosphorus oxynitride (LiPON), lithium lanthanum titanium oxide (LLTO), etc.), lithium sulfide based electrolytes and other lithium phosphate based electrolytes such as a lithium borophosphate (LiBP). The LiPON can be preferably used for the electrolyte 128 since it has a preferable ionic conductivity and electrochemical stability. The electrolyte 128 can be deposited by using conventional vapor deposition technique such as sputtering. In an embodiment shown in FIG. 1, the electrolyte 128 may be deposited on the cathode 126 so as to fully cover a surface and edges of the cathode 126.

The anode 130 may include silicon and/or materials that have a melting point higher than curing temperature of the insulator 134. Specifically, the anode 130 may be an Li-free anode, in which the anode 130 is formed by electroplating of metallic lithium or lithiation at the interface between the electrolyte 128 and the anode current collector 132 upon the initial charge. Alternatively, the anode 130 may be an Li-ion anode such as silicon tin oxynitride (SiTON), tin and zinc nitrides. By employing the aforementioned anode 130, the anode 130 can withstand temperatures for curing the insulator 134. However, in other embodiments, metallic lithium that has a melting point of 180 degree Celsius may not be excluded from candidates of the anode material as long as the anode material can withstand the curing temperature.

In an embodiment, each solid thin film battery element 122 can be fabricated as an all-solid-state thin film battery. In a particular embodiment, the total thickness of the solid thin film battery element 122 may be less than or equal to ten micrometers (e.g., ~10 um).

The through vias 144, 146 may be formed within the stacked battery layers 110 to provide a conductive path between an external device and the solid thin film battery elements 122. Note that the through vias 144, 146 may be or may not be formed completely through the stacked battery layers 110 from a top surface to the bottom surface. The through vias 144, 146 may be formed through at least one substrate 120 of the stacked battery layers 110 (e.g., the second substrate 120B and the third substrate 120C in FIG. 1) other than that of the bottom battery layer (e.g., the first substrate 120A in FIG. 1).

Each through via 144, 146 may be formed in a hole that may be opened through the stacked battery layers 110. The holes may be made conductive by filling a conductive material (e.g., solder paste) in the hole or depositing a conductive material (e.g., metal) on inner surfaces of the hole to form the through vias 144, 146. The through via 144 may be contacted at surfaces of the cathode current collectors 124 (e.g., 124A-124C). The through via 146 may be contacted at surfaces of the anode current collectors (e.g., 132A-132C).

The wiring layer 150 built on the top of the stacked battery layers 110 may have a conductive element (e.g., wiring pattern) connecting the through vias 144, 146 with external terminals that may be connected to the external device such as a CPU (Central Processing Unit), memory, etc. The wiring layer 150 may also be made from a resin as insulator for the wiring layer. The resin may be any one of a BCB (benzocyclobutene) resin, a polyimide and other polymers having a curing temperature in a range of 50-350 degrees Celsius, more preferably, 150-250 degrees Celsius.

The structure of the stacked battery structure 100 may not be limited to the embodiment shown in FIG. 1. Although not shown in FIG. 1, there may be an additional layer in the stacked battery structure 100. For example, the solid thin film battery element 122 may be covered by other protective coatings before depositing resin of the insulator 134.

Also the layout of the solid thin film battery elements 122 within the stacked battery structure 100 may not be limited to the embodiment shown in FIG. 1 where all of the solid thin film battery elements 122 are connected by the through via 144,146 in parallel.

In another embodiment, such a layout where at least two of the solid thin film battery elements 122 are connected in series by using through vias and/or a surface wiring layer, such as the wiring layer 150, may be employed. Connecting the solid thin film battery elements 122 in series can increase a terminal voltage of the stacked battery structure while maintaining a small footprint of the stacked battery structure. Since electrode materials that are not practically used so far due to its lower potential difference can be employed by connecting the elements in series, a range of design choices for electrode materials can be broadened. Also, in other aspects, a plurality of terminal voltages can be obtained from the stacked battery structure 100 with serial connection.

For example, first and second layers and third and fourth layers of stacked battery layers 110 can be connected in parallel, respectively, and a set of the first and second layers and a set of third and fourth layers can be connected in series. In such case, interconnection between a plurality of layers can be achieved not only by a through via but also other surface wiring layers, such as the wiring layer 150, after routing each electrical path from each current collector to top of the stack by respective via structure. The through via 144, 146 may be opened through all layers 110 including top to bottom layers or may be opened through a part of the layers 110 by terminating the hole at a current collector of a middle layer. Even if the through via 144, 146 is opened through the all layers 110 from top to bottom, the though via 144, 146 may not be required to connect with all current collectors 124, 132.

Figure 2A:
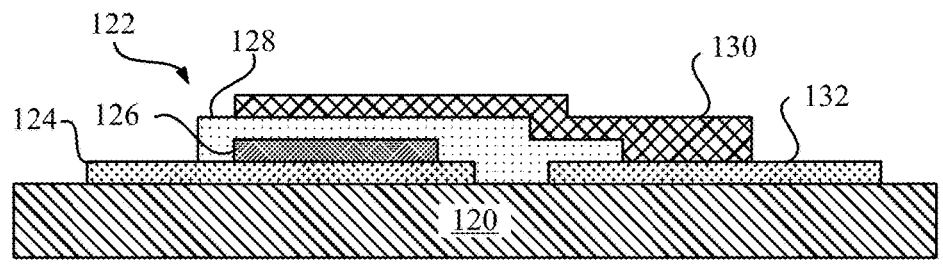
FIGS. 2A-2D illustrate a first half of a method for fabricating the stacked battery structure according to an embodiment of the present invention.
Figure 2B:
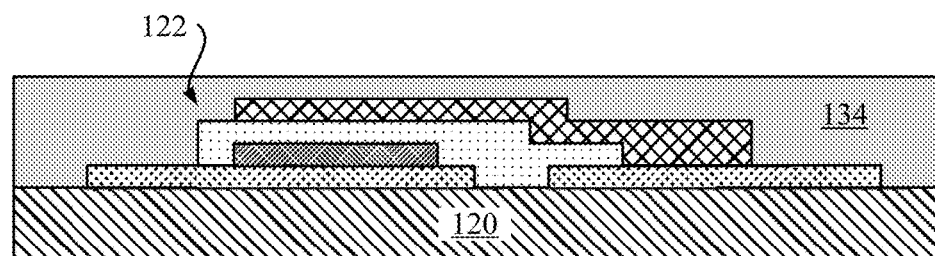
Figure 2C:
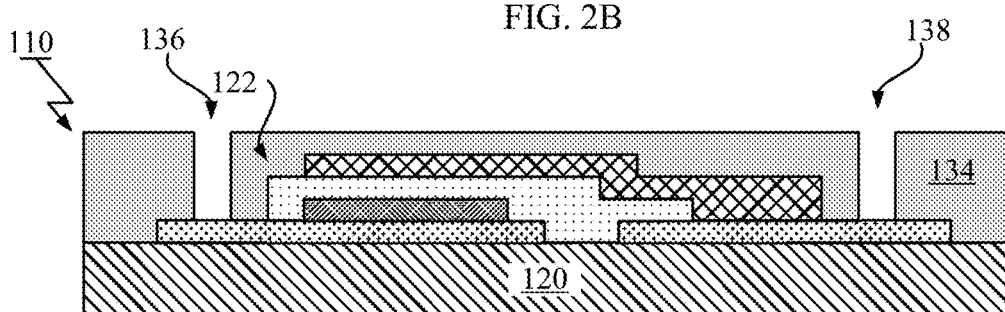
Figure 2D:
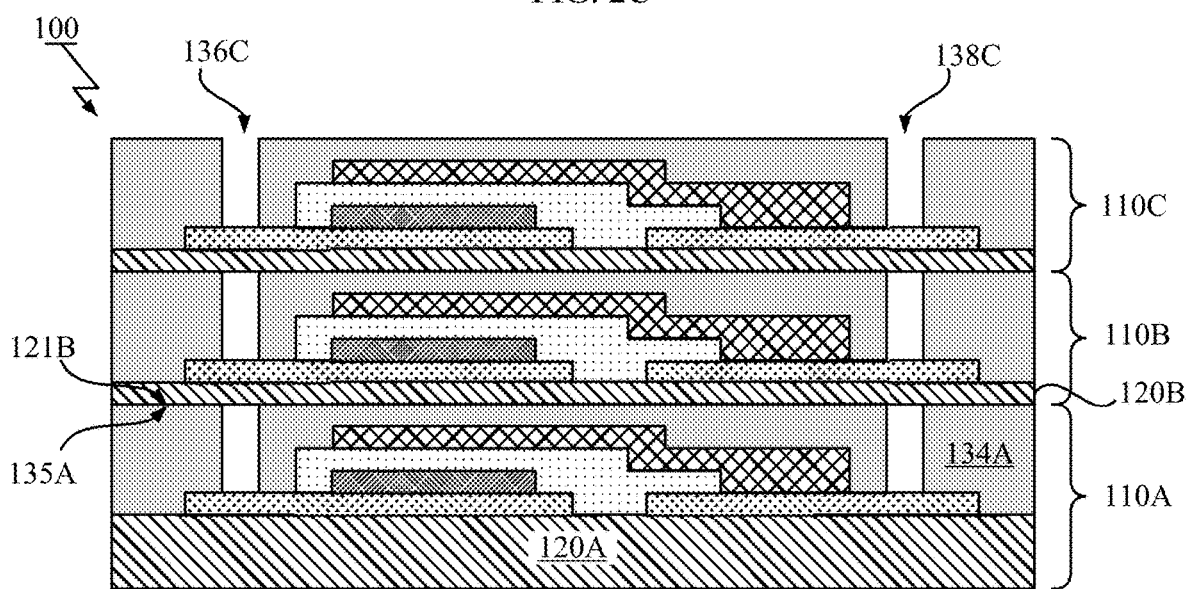
Figure 3A:
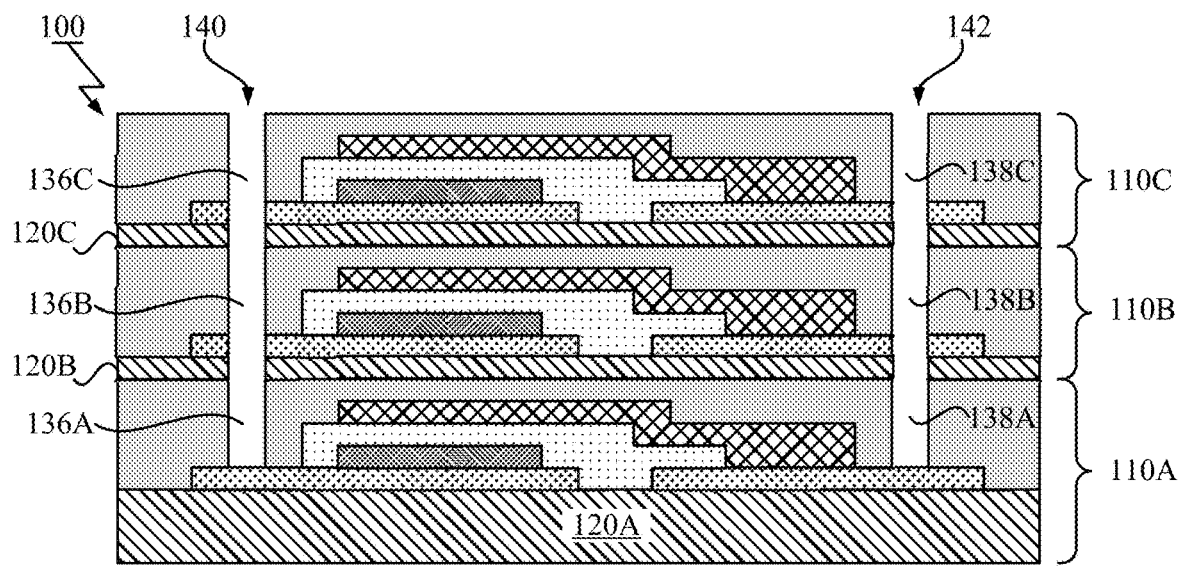
FIGS. 3A-3C illustrate a latter half of the method for fabricating the stacked battery structure according to an embodiment of the present invention.
Figure 3B:
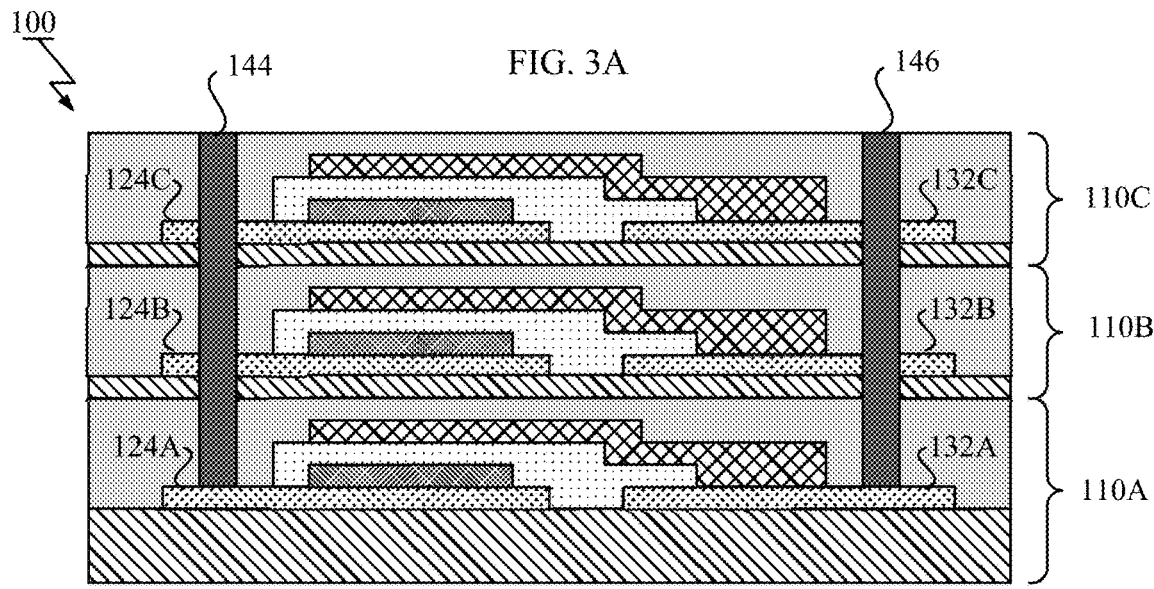
Figure 3C:
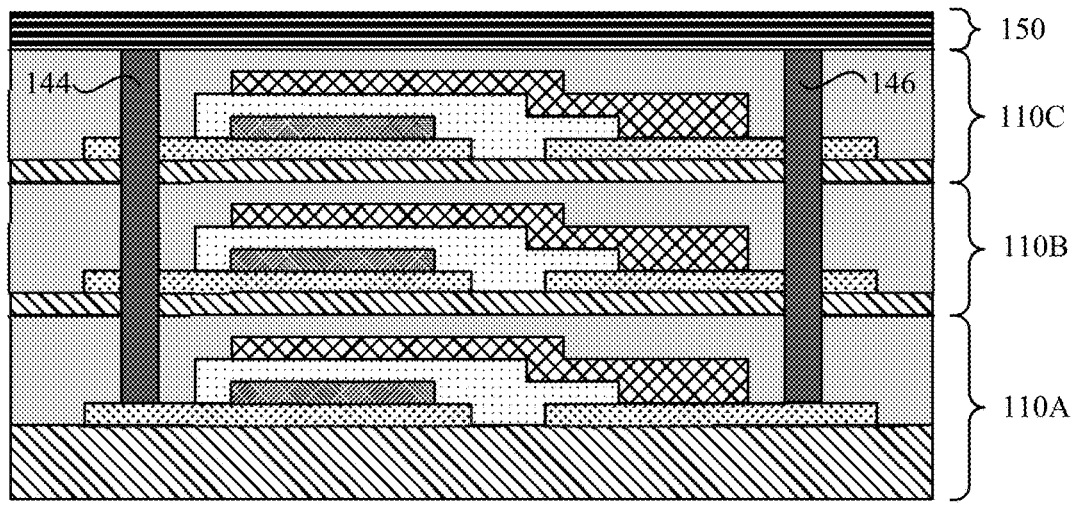

Referring to series of FIGS. 2-3, a fabrication process for fabricating the stacked battery structure 100 is illustrated according to an embodiment of the present invention. FIGS. 2A-2D illustrate a first half of the fabrication process and FIGS. 3A-3C illustrate a latter half of the fabrication process.

As shown in FIG. 2A, the fabrication process may include a step of arranging, for each battery layer 110, the substrate 120 that has the solid thin film battery element 122 fabricated thereon. The solid thin film battery element 122 may be fabricated on the substrate 120 by using any conventional process. For example, the solid thin film battery element 122 can be fabricated by a sequence of vapor deposition processes.

The exemplary process for fabricating the solid thin film battery element 122 may include steps of (a) depositing the anode and cathode current collectors 124,132 on the substrate 120; (b) depositing the cathode 126 on the cathode current collector 124 under low temperature; (c) annealing the cathode 126 at a predetermined annealing temperature in a range of 500-700 degrees Celsius to obtain a fully crystalline phase; (d) depositing the electrolyte 128 with fully covering the cathode 126; and (e) depositing the anode 130 on the electrolyte 128 and the anode current collector 132. In another embodiment, instead of steps (b) and (c), the process may include a step of (f) depositing the cathode 126 on the cathode current collector 124 under a predetermined deposition temperature in a range of 500-700 degrees Celsius while heating the substrate 120.

As shown in FIG. 2B, the fabrication process may also include a step of forming the insulator 134 over the solid thin film battery element 122 and substrate 120 for each battery layer 110.

In a particular embodiment, the step of forming the insulator 134 may include sub-steps of depositing an insulation material over the solid thin film battery element 122; and subsequent flattening of the insulation material.

The sub-step of flattening can be done by squeezing the insulation material (e.g., squeezing technique), fly-cutting the insulation material (e.g., fly-cutting technique), and/or chemically and mechanically polishing the insulation material (e.g., CMP technique). Alternatively, the sub-step of flattening can be done based on spin on glass technique where the substrate 120 retaining insulation material deposited thereon are spun at high speeds to distribute the isolation material uniformly across the substrate 120.

As shown in FIG. 2C, the fabrication process may further include a step of opening holes 136, 138 into the insulator 134 at positions corresponding to the through vias 144, 146 for each battery layer 110. The holes 136, 138 may be opened by using conventional technique such as photopatterning, laser processing, etc. For example, the resin of photo-patterned via-locations may be removed from the insulator 134 to open the hole 136, 138 into the insulator 134. The hole may have a dimension of several tens micrometers (e.g., 50 um diameter/width).

Note that the step of opening the holes 136, 138 may be performed posterior to the step of flattening so as to prevent dusts, which may be generated during the sub-step of flattening, from slipping into the holes 136, 138.

By performing the steps described in FIGS. 2A-2C, the plurality of battery layers 110A-110C ready for stacking, each of which may include the respective substrate 120, the respective solid thin film battery element 122 and the respective insulator 134, can be prepared separately. In a particular embodiment, the substrate 120 of the battery layer 110 may be subject to back-grinding to reduce the thickness of the substrate 120 and the overall thickness of the battery layer 110.

As shown in FIG. 2D, the fabrication process may include a step of stacking the plurality of battery layers 110 such that the insulator of lower battery layers (e.g., the first insulator 134A) bonds to the substrate of upper battery layers (e.g., the second substrate 120B) by the flat top surface (the first flat top surface 135A).

In a particular embodiment, the step of stacking the plurality of battery layers 110 may include a sub-step of curing the insulators 134 by making the resin of the insulator 134 undergo a curing temperature. By curing the insulator 134, the flat top surface of the lower insulator (e.g., the first flat top surface 135A) and the flat bottom surface of the upper substrate (e.g., the second flat bottom surface 135B) are rigidly fixed each other.

As shown in FIG. 3A, the fabrication process may include a step of opening holes 140, 142 through the stacked battery layers 110A-110C. The step of opening the holes 140, 142 may include sub-step of connecting vertically aligned holes (one set of the holes 136A-136C and other set of the holes 138A-138C) by etching the substrate 120 separating the vertically aligned holes (e.g., the second substrate 120B and the third substrate 120C) to make through holes 140, 142 within the stacked battery layers 110A-110C. The etching of the substrate 120 can be conducted by using conventional wet or dry etching technique. Since the holes 136, 138 are opened in each insulator 134A-134C prior to the stacking, subsequent deep etching after the stacking can be conducted with high selectivity, resulting in high speed via opening.

Note that if a laser-processable insulator material is used instead of the photosensitive adhesive, the step of opening the holes 136, 138 for each layer can be omitted and the holes 140, 142 can be directly drilled by laser through both of the insulators 134A-134C and the substrate 120B-120C within the stacked battery layers 110A-110C during the step of opening holes 140, 142.

As shown in FIG. 3B, the fabrication process may include a step of filling a conductive material in the holes 140, 142 to form the through vias 144, 146 as the conductive paths. The filling of the conductive material can be performed by using conventional techniques, such as solder paste filling. Each through via 144, 146 may electrically connect with the respective current collectors 124A-124C/132A-132C of the stacked battery layers 110A-110C. Alternatively, the fabrication process may include a step of depositing a conductive material on the inner surface of the holes 140, 142 instead of filling the conductive material. The filling of the conductive material may be preferable in terms of conductivity and stability of the obtained through via 144, 146.

By performing the steps described in series of FIGS. 3A-3B, the conductive paths each connecting with the respective current collector 124A-124C/132A-132C can be formed within the stacked battery layers 110A-110C. The process for fabricating the conductive path will be described later in more detail.

As shown in FIG. 3C, the fabrication process may include a step of building the wiring layer 150 on the top of the stacked battery layers 110A-110C. The wiring layer 150 may have a conductive element connecting the through vias 144, 146 with external terminals, which is used to connect to an external device, such as CPU and memory. The step of building the wiring layer 150 may include a sub-step of forming a resin as insulator for the wiring layer 150 by curing the resin for isolating the wiring layer 150. The resin may be any one of a BCB (benzocyclobutene) resin, a polyimide and other polymers with a curing temperature in a range of 50-350 degrees Celsius, more preferably, 150-250 degrees Celsius.

Although the aforementioned description has been focused on a single stacked battery structure 1000, the fabrication process can be conducted on not chip or package level, but wafer or panel level. In a particular embodiment, the substrate 120 may have a wafer or panel form and the substrate 120 may include a plurality of the solid thin film battery elements 122. After bonding the plurality of the battery layers 110, which may be in a form of stacked wafers or panels, the plurality of battery layers 110 may be diced into a plurality of chips, each of which has respective stacked battery structure 100.

According to an embodiment shown in FIGS. 2-3, since each battery layer 110 prepared for stacking has the solid thin film battery element 122 that is already fabricated, other components of the stacked battery structure 100 would not be damaged due to the heating process for cathode 126. In other words, the material of the cathode 126 can be transformed into a crystalline phase without damaging the other components.

Since most probable thermal processes after the stacking may include curing of the insulator 134 and the wiring layer 150, the other components would not be damaged throughout the fabrication process as long as the other components can withstand the curing temperature.

Referring to series of FIGS. 4-5, a process for fabricating a through via with a stepped shape structure and a stacked battery structure 100 with the through via according to an embodiment of the present invention will be described. FIG. 4 shows a schematic of connected current collectors 124 in the stacked battery structure 100. FIG. 5 illustrates a process for fabricating the through via with the stepped shape structure. The cross-sectional views shown in FIG. 6 correspond to cross-sections indicated by the arrow "V" in the FIG. 4.

FIG. 4A depicts a cross-sectional view of the stacked battery structure 100. FIG. 4B depicts top views of three battery layers 110A-110C around the cathode current collector 124 before the stacking step. A correspondence relation between the cross-sectional view shown in FIG. 4A and the top views shown in FIG. 4B is depicted by arrows and labels.

As shown in FIG. 4B, the substrate 120, the cathode current collector 124 and the insulator 134 with the hole 136 may be layered for each battery layer 110. The holes 136A-136C may have at least one respective horizontal dimension enlarged from bottom to top in the stacked battery layers 110A-110C and the holes 136A-136C may be overlapped each other in a horizontal plane of the substrate 120.

Figure 5A:
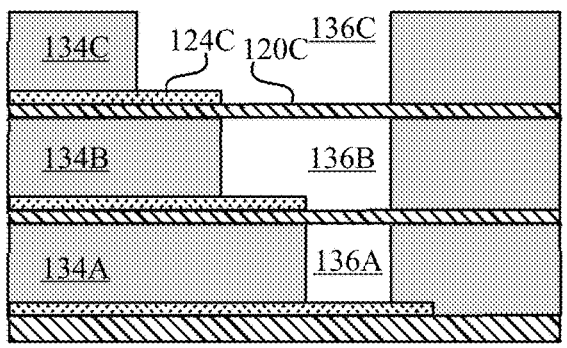
FIGS. 5A-5F illustrate a method for fabricating a through via with a stepped shape structure according to an embodiment of the present invention.

FIG. 4C and FIG. 5A respectively depict a top view and cross-sectional view of the stacked battery layers 110A-110C just after the stacking step. As shown in FIG. 4C, after the stacking step, the cathode current collector 124C and the substrate 120C of the top battery layer 110C can be seen through the hole 136C when viewed from above.

Figure 5B:
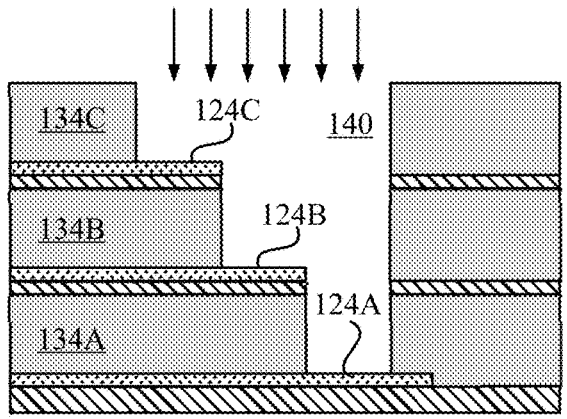

FIG. 4D and FIG. 5B respectively depict a top view and a cross-sectional view of the stacked battery layers 110A-110C just after the step of opening the hole 140. By etching the substrates 120B, 120C through the top hole 136C, the vertically aligned holes 136A-136B would be connected to form the hole 140 through the stacked battery layers 110A-110C. Note that the current collector 124 may work as etch stopper, thus, the current collector 124 would not be etched during the course of the etching. As shown in FIG. 4D, after the opening step, all cathode current collector 124A-124C can be seen through the top hole 136C (e.g., hole 140) when viewed from normal direction with respect to the substrate 120.

FIG. 4E depicts a top view of the stacked battery layers 110A-110C just after the step of filling the conductive material into the hole 140. FIGS. 5C-5F show in detail the process for fabricating the through via after making the though hole 140 with cross-sectional views of the structure.

Figure 5C:
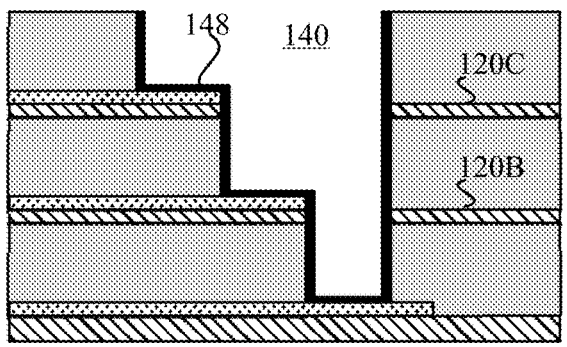

As shown in FIG. 5C, upon opening the hole 140 through the stacked battery layers 110A-110C, an inner surface of the hole 140 may be coated with an insulation material (e.g., polymer) 148 so as to insulate a sidewall of the substrates 120B, 120C. The coating of the insulation material can be performed by using conventional technique such as vapor deposition polymerization.

Figure 5D:
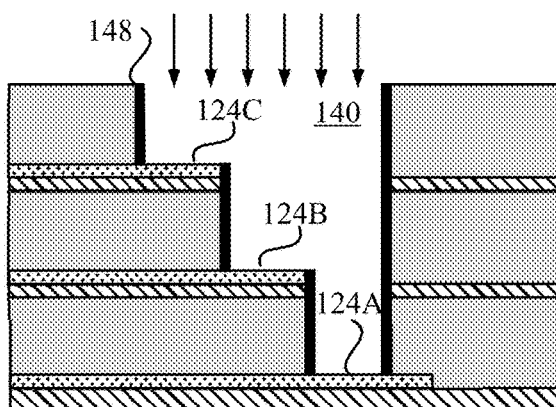

As shown in FIG. 5D, portions of the insulation material 148 deposited on the cathode current collectors 124A-124C may be etched back by conventional anisotropic etching so as to expose surfaces of the cathode current collectors 124A-124C. At this point, the hole 140 may have a plurality of sections, each of which corresponds to each battery layer 110 and has a terrace exposing each corresponding cathode current collector 124 (e.g., the second and third cathode current collectors 124B, 124C) or an inner bottom surface exposing the corresponding cathode current collector 124 (e.g., the first cathode current collector 124A).

Figure 5E:
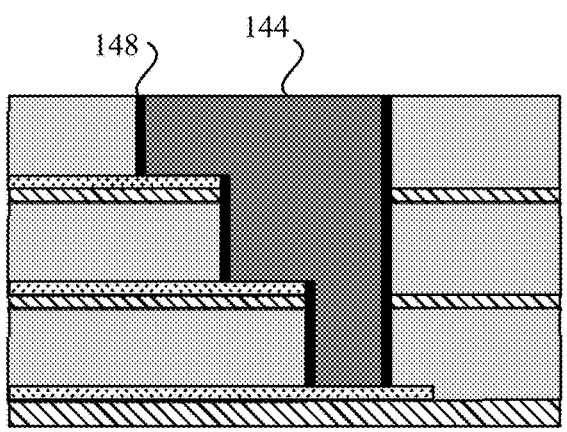

As shown in FIG. 5E, the conductive material are filled into the hole 140 to form the through via 144. Alternatively, the conductive material may be deposited on the inner surface of the hole 140 to form the through via 144 as shown in FIG. 5F.

As shown in FIG. 4E, after the filling or depositing step, the through via 144 can be seen when viewed from above, while all cathode current collector 124A-124C are covered by the conductive material.

Figure 5F:
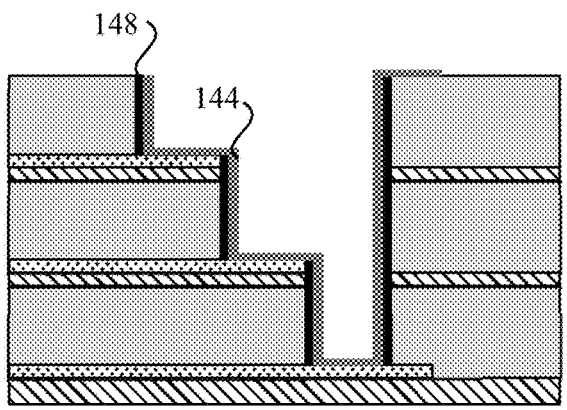

Such stepped shape structure shown in FIGS. 5E and 5F would enable the stacked battery structure 100 to have reliable contact between the through via 144 and the current collectors 124A-124C of the film battery layers 110A-110C.

In the aforementioned embodiment shown in FIGS. 4-5, the holes 136A-136C are described to have at least one respective horizontal dimension enlarged from bottom to top and to overlap each other in the horizontal plane of the substrate 120. However, the structure of the through via 144 may not be limited to the embodiment shown in FIGS. 4-5.

Hereinbelow, with referring to FIG. 6, a process for fabricating a through via with an overhanging shape structure and a stacked battery structure 100 with the through via according to another embodiment of the present invention will be described. FIG. 6 illustrates a process for fabricating the through via with the overhanging shape structure. The cross-sectional views shown in FIG. 6 follow that shown in FIG. 5.

In an embodiment, the plurality of battery layers 110A-110B may have common or identical planar structure, which may include the cathode current collector 124 and the anode current collector 132 as well as the holes 136, 138.

Figure 6A:
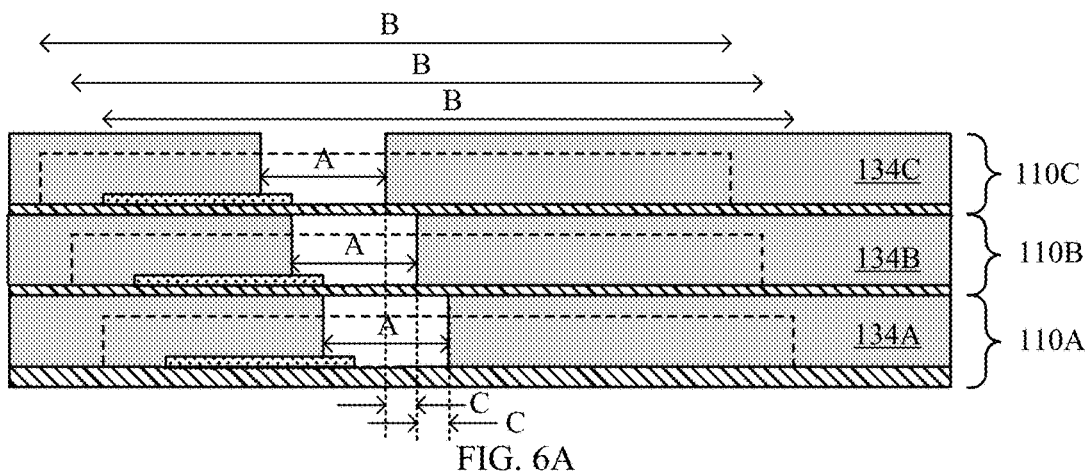
FIGS. 6A-6E illustrate a method for fabricating a through via with an overhanging shape structure according to an embodiment of the present invention.

Referring to FIG. 6A, a cross-sectional view of the stacked battery layers 110A-110C just after the stacking step is shown. In the embodiment shown in FIG. 6A, every battery layer 110 has an identical planar design with same dimension "B". The dimension "B" may relate to an area of the solid thin film battery element 122, which is depicted by the dash line in FIG. 6.

In addition, the holes opened in the insulators 134A-134C may have a same shape and a same dimension "A". The dimension "A" may relate to diameter or width of the hole. Using an identical planar design across the plurality of battery layers 110A-110C would reduce the number of patterning masks.

As shown in FIG. 6A, the plurality of battery layers 110A-110 may be stacked such that the holes opened in the insulators 134A-134C are shifted along with a direction (e.g., lateral and/or longitudinal direction) with alignment gap "C" in the horizontal plane of the substrate 120. In a particular embodiment, the alignment gap "C" may be in a range from several micrometers to ten and several micrometers (e.g., 5~15 um).

Figure 6B:
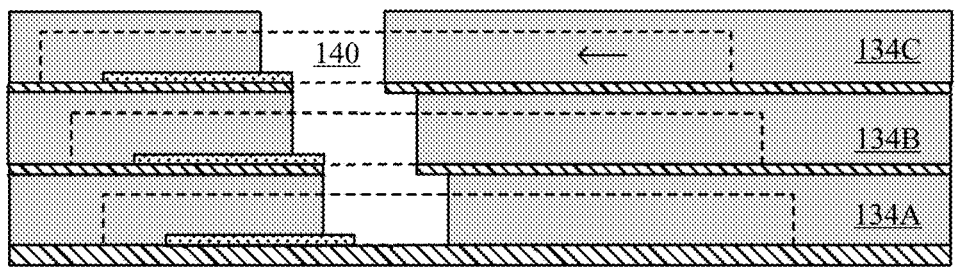

Referring to FIG. 6B, a cross-sectional view of the stacked battery layers 110A-110C just after the step of opening the hole 140 is shown. As shown in FIG. 6B, by etching the substrates 120B, 120C through the top hole 136C, the aligned individual holes 136A-136B would be connected to form the hole 140 through the stacked battery layers 110A-110C.

Figure 6C:
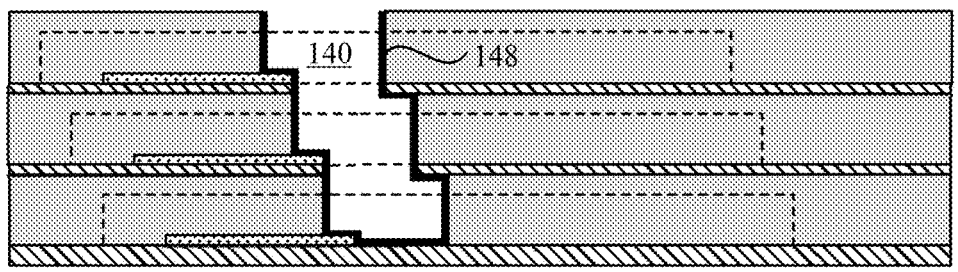

Referring to FIG. 6C, a cross-sectional view of the stacked battery layers 110A-110C just after the step of depositing the insulation material 148. As shown in FIG. 6C, after opening the hole 140, an inner surface of the hole 140 may be coated with the insulation material 148.

Figure 6D:
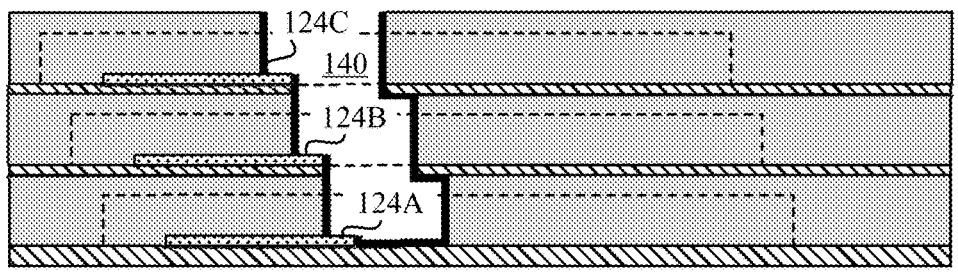

Referring to FIG. 6D, a cross-sectional view of the stacked battery layers 110A-110C just after the step of etching back. As shown in FIG. 6D, portions of the insulation material 148 on the cathode current collectors 124A-124C may be etched back so as to bare surfaces of the cathode current collectors 124A-124C. As similar to the embodiment shown in FIGS. 4-5, at this point, the hole 140 may have a plurality of sections, each of which corresponds to each battery layer 110 and has a terrace (e.g., surface) exposing each corresponding cathode current collector 124 (e.g., the cathode current collectors 124A, 124B, 124C).

Figure 6E:
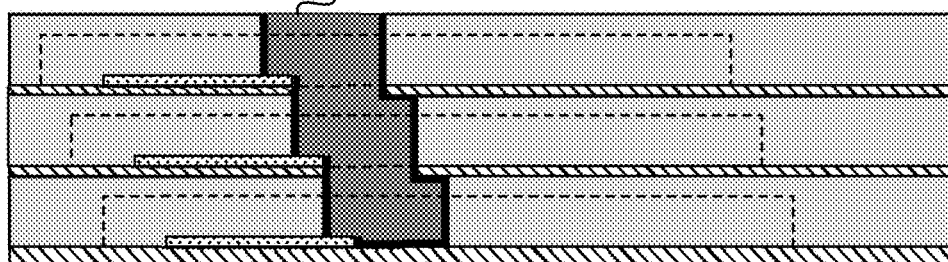

Referring to FIG. 6E, a cross-sectional view of the stacked battery layers 110A-110C just after the step of filling a conductive material. As shown in FIG. 6E, the conductive material may be filled into the hole 140 to form the through via 144. As described above, although not shown, alternatively, the conductive material may be deposited on the inner surface of the hole 140 to form the through via 144.

Such overhanging shape structure shown in FIGS. 6A-6E would enable fabrication of the stacked battery structure 100 with low cost while achieving reliable connection between the through via 144 and the current collectors 124A-124C, since each battery layer 110 can be fabricated using the same design.

Although having the overhanging shape structure, the hole 140 can be fabricated by using conventional vapor deposition polymerization and solder paste filling techniques.

Hereinafter, referring to FIG. 7, schematics of an electronic device including a stacked battery structure 100 according to one or more exemplary embodiments of the present invention will be described. The electronic device may be used for IoT devices.

FIG. 7A depicts a schematic of a system-on-package configuration for an electronic device that includes the stacked battery structure 100. As shown in FIG. 7A, the stacked battery structure 100 may be mounted on a wiring substrate 170 on which one or more external electronic components 172A, 172B, such as processor, memory, sensor, are mounted.

FIG. 7B depicts a schematic of a system-on-battery configuration for an electronic device that includes the stacked battery structure 100. As shown in FIG. 7B, the stacked battery structure 100 can be used as a substrate for other one or more electronic components 152A, 152B.

In an embodiment, the stacked battery structure 100 has the wiring layer 150 on the top surface of the stacked battery layers 110 for connecting the stacked battery structure 100 with one or more electronic components 152A, 152B mounted on the stacked battery structure 100. The system-on-battery configuration may be advantageous for further miniaturization.

Since the power source of the electronic device has a small footprint, overall size of the electronic device can be miniaturized.

According to one or more embodiments of the present invention, the stacked battery structure 100 can have an improved battery characteristic including large capacity, small internal resistance and/or high voltage depending on a mode of connection (e.g., parallel and series) while maintaining a small footprint and reducing internal mechanical stress.

Figure 8A:
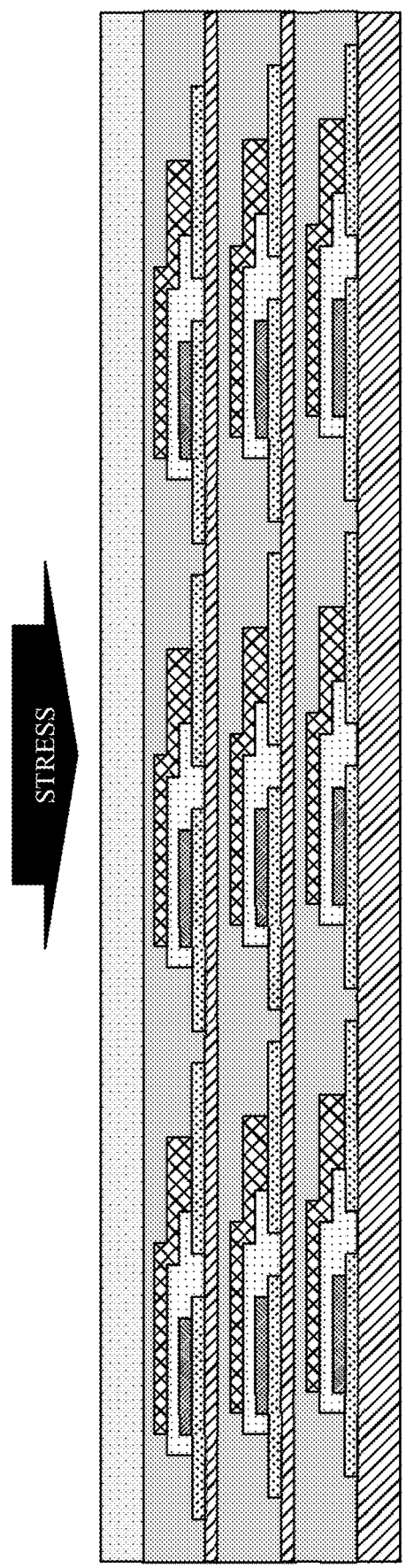
FIGS. 8A and 8B illustrate a comparison between stacked battery structures with and without a flatten insulator.
Figure 8B:
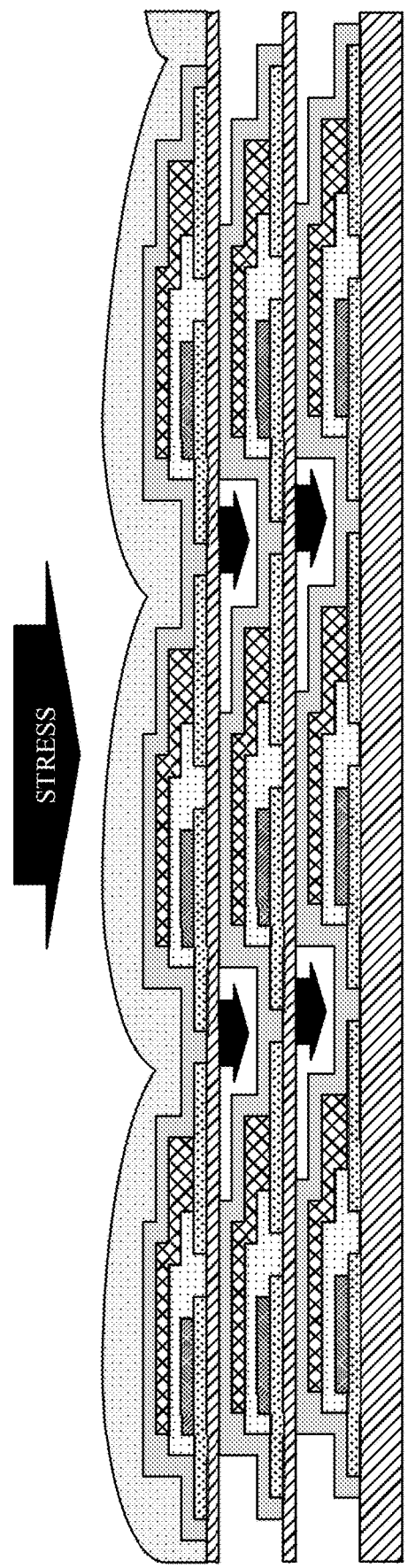

Referring to FIG. 8, a comparison between stacked battery structures with and without a flatten insulator are described. As described above, the solid thin film battery element 122 may have a non-negligible thickness, which may reach to several micrometers. Thus, if the solid thin film batteries are stacked as it is, internal stress may be induced around the electrode/electrolyte interface when stacking the battery layers 110 or affected by external force.

The solid electrolytes, such as LiPON, are generally brittle and such brittleness of the solid electrolyte may cause damage, such as cracking, which leads to short circuit of the cell. Even nominal mechanical stress on the electrode/electrolyte interface would cause damage on the electrolyte material.

In contrast to the stacked solid thin film batteries without the insulator, in the stacked battery structure 100 according to the one or more embodiment of the present invention, the insulator 134 with the flat top surface 135 may be formed over the solid thin film battery element 122 to bond to the substrate 120 of upper layer 110. Thus, the overall structure of the stacked battery layers 110 would have a rigid and dense structure, which alleviates mechanical stress affecting on brittle solid electrolyte when stacking the plurality of battery layers 110.

With regard to the capacity of the stacked battery structure 100, the capacity can be enhanced to be N times C, where N represents the number of the battery layers and C represents the capacity per layer. With regard to the internal resistance, the internal resistance within the stacked battery structure 100 can be reduced to be R/N where N represents the number of the battery layers connected in parallel and R represents internal resistance per layer. With regard to the voltage, the terminal voltage of the stacked battery structure 100 can be increased to be V times N where N represents the number of the battery layers connected in series and V represents voltage per layer. With regard to the footprint of the stacked battery structure 100, since the plurality of the solid thin film battery elements 122 is arranged in a stacked manner, footprint of the stacked battery layer 100 may be comparable to single solid thin film battery elements. Thus, an improved battery characteristic with maintaining a small foot print can be achieved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, steps, layers, elements, and/or components, but do not preclude the presence or addition of one or more other features, steps, layers, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for fabricating a stacked battery structure, the method comprising:
    forming a plurality of battery layers separately, wherein each battery layer includes a substrate, a film battery element fabricated on the substrate and an insulator formed over the film battery element, the insulator having a flat top surface and the film battery element including a current collector;
    stacking the plurality of battery layers, wherein the insulator of a first battery layer of the plurality of battery layers bonds to the substrate of a second battery layer of the plurality of battery layers by the flat top surface; and
    forming a conductive path within the plurality of battery layers, the conductive path connecting with at least one of the current collectors of the plurality of battery layers, wherein the conductive path is a through via having a plurality of sections, the plurality of sections overlapping each other in a horizontal plane of the substrate.

2. The method of claim 1, wherein forming the plurality of battery layers further comprises:
    arranging the substrate having the film battery element fabricated thereon for each battery layer;
    depositing an insulation material over the film battery element for each battery layer; and
    flattening the insulation material to form the insulator having the flat top surface for each battery layer.

3. The method of claim 2, wherein flattening comprises at least one process selected from the group consisting of squeezing the insulation material, fly-cutting the insulation material, chemically and mechanically polishing the insulation material, and spinning the substrate retaining the insulation material deposited thereon.

4. The method of claim 1, wherein:
    forming the plurality of battery layers comprises opening a hole in the insulator at a position corresponding to the conductive path for each battery layer; and
    forming the conductive path comprises connecting the hole in each of the insulators of the plurality of battery layers by etching at least one substrate of the plurality of battery layers to form the through via.

5. The method of claim 4, wherein each of the holes have at least one respective horizontal dimension enlarged from bottom to top in the plurality of battery layers, such that the holes overlap each other in a horizontal plane of the substrate.

6. The method of claim 4, wherein the plurality of battery layers have a common planar structure and each of the holes have a same shape and a same dimension, the holes and the common planar structure being shifted along a direction in the horizontal plane of the substrate.

7. The method of claim 1, wherein forming the conductive path further comprises:
    opening a hole for the through via through the plurality of battery layers;
    coating an inner surface of the hole with an insulation material to insulate a sidewall of at least one substrate;
    etching back portions of the insulation material coated on at least one of the current collectors of the plurality of battery layers to expose a surface of the at least one of the current collectors; and
    filling a conductive material in the hole or depositing the conductive material on the inner surface of the hole to form the through via as the conductive path.

8. The method of claim 1, further comprising curing the insulators of the plurality of battery layers to fix the flat top surface of the insulator of the first battery layer of the plurality of battery layers and a bottom surface of the substrate of the second battery layer of the plurality of battery layers.

9. The method of claim 8, wherein the insulator includes a resin having a predetermined curing temperature in a range of 50-350 degrees Celsius and the film battery element includes a cathode, the cathode being annealed at a predetermined annealing temperature in a range of 500-700 degrees Celsius after low temperature deposition or deposited under a predetermined deposition temperature in a range of 500-700 degrees Celsius prior to at least the stacking.

10. The method of claim 9, wherein the resin includes at least one material selected from the group consisting of benzocyclobutene (BCB) resin and polymers having a curing temperature in a range of 50-350 degrees Celsius.

11. The method of claim 1, further comprising posterior to forming the conductive path, forming a wiring layer on a top of the plurality of battery layers, the wiring layer having a conductive element connecting the conductive path with an external terminal.

12. The method of claim 11, wherein forming the wiring layer comprises forming a resin as insulator for the wiring layer by curing the resin for isolating the wiring layer, the resin including at least one material selected from the group consisting of a benzocyclobutene (BCB) resin, a polyimide and polymers having a curing temperature in a range of 50-350 degrees Celsius.

13. The method of claim 1, wherein the substrate is a wafer or panel and the substrate includes a plurality of film battery elements for each battery layer, the method further comprising:
   posterior to at least stacking the plurality of battery layers, dicing the plurality of battery layers into a plurality of chips, each chip having a respective stacked battery structure.

14. The method of claim 1, wherein each film battery element includes an anode, the anode being formed from silicon or one or more materials having a melting point higher than curing temperature of the insulator.

15. The method of claim 4, wherein the through via is exposed at the top of each battery layer.

16. A method for fabricating a stacked battery structure, the method comprising:
   forming a plurality of battery layers separately, wherein each battery layer includes a substrate, a film battery element fabricated on the substrate and an insulator formed over the film battery element, the insulator having a flat top surface and the film battery element including a current collector;
   stacking the plurality of battery layers, wherein the insulator of a first battery layer of the plurality of battery layers bonds to the substrate of a second battery layer of the plurality of battery layers by the flat top surface; and
   forming a through via within the plurality of battery layers and exposed at the top of each battery layer, the through via connecting with at least one of the current collectors of the plurality of battery layers, wherein the through via has a plurality of sections, the plurality of sections overlapping each other with a staggered arrangement in a horizontal plane of the substrate.

17. The method in claim 16, wherein forming the through via comprises:
   opening a hole for the through via through the plurality of battery layers;
   coating an inner surface of the hole with an insulation material to insulate a sidewall of at least one substrate;
   etching back portions of the insulation material coated on at least one of the current collectors of the plurality of battery layers to expose a surface of the at least one of the current collectors; and
   filling a conductive material in the hole or depositing the conductive material on the inner surface of the hole to form the through via as a conductive path.

18. A method for fabricating a stacked battery structure, the method comprising:
   forming a plurality of battery layers separately, wherein each battery layer includes a substrate, a film battery element fabricated on the substrate and an insulator formed over the film battery element, the film battery element including a current collector;
   stacking the plurality of battery layers; and
   forming a through via within the plurality of battery layers and exposed at the top of each battery layer, the through via connecting with at least one of the current collectors of the plurality of battery layers, wherein the through via is a conductive path having a plurality of sections, the plurality of sections overlapping each other in a horizontal plane of the substrate.

19. The method of claim 18, wherein stacking the plurality of battery layers comprises the insulator of a first battery layer of the plurality of battery layers bonding to the substrate of a second battery layer of the plurality of battery layers by the flat top surface.

20. The method of claim 18, wherein the through via includes an insulation material and a conductive material.

* * * * *